US007656575B2

(12) United States Patent
Padilla

(10) Patent No.: US 7,656,575 B2
(45) Date of Patent: Feb. 2, 2010

(54) PRINTABLE PIXEL STRUCTURE WITH CARBON FIBER EMITTERS

(76) Inventor: Patrick T. Padilla, P.O. Box 772352, Coral Springs, FL (US) 33077

( * ) Notice: Subject to any disclaimer, the term of this patent is extended or adjusted under 35 U.S.C. 154(b) by 815 days.

(21) Appl. No.: 11/216,856

(22) Filed: Aug. 31, 2005

(65) Prior Publication Data

US 2007/0046959 A1 Mar. 1, 2007

(51) Int. Cl.
*G02B 26/00* (2006.01)
*G02F 1/03* (2006.01)
*G02F 1/07* (2006.01)

(52) U.S. Cl. ....................................... 359/296; 359/245

(58) Field of Classification Search ................. 359/245, 359/296

See application file for complete search history.

(56) References Cited

U.S. PATENT DOCUMENTS 4,871,236 A 10/1989 Gemma et al.
5,739,946 A * 4/1998 Iwanaga et al. ............. 359/296
6,005,692 A 12/1999 Stahl
6,268,092 B1 7/2001 Akashi et al.
6,456,423 B1 9/2002 Nayfeh et al.
6,573,960 B2 6/2003 Kobayashi et al.
6,724,511 B2 4/2004 Gudesen et al.
6,734,941 B2 5/2004 Yamazaki et al.
6,784,610 B2 8/2004 Ellis
6,791,738 B2 9/2004 Reynolds et al.
6,800,722 B2 10/2004 Pei
6,858,325 B2 2/2005 Senoo et al.
6,869,695 B2 3/2005 Thompson et al.
6,872,113 B2 3/2005 Yu et al.
2004/0201551 A1 10/2004 Suzuki et al.
2005/0012459 A1 1/2005 Padilla

FOREIGN PATENT DOCUMENTS

EP 1 039 784 9/2000

OTHER PUBLICATIONS

Philips, Digital Displays: Interfacing with the future http://www.semiconductors.philips.com/technologies/display/.

* cited by examiner

*Primary Examiner*—Ricky L. Mack
*Assistant Examiner*—Mahidere S Sahle

(57) ABSTRACT

A sub-pixel for use in a color pixel structure, includes a microwire preferably printed on a substrate, the microwire having a gap in it; a carbon filament spanning the gap and having opposite ends of the filament in electrical communication with the wire; an electro-optic gel having a tint of one primary color of a white light spectrum, the gel enveloping the carbon filament.

12 Claims, 4 Drawing Sheets

PRINTABLE PIXEL STRUCTURE WITH CARBON FIBER EMITTERS

BACKGROUND OF THE INVENTION

1. The invention relates to the art of pixels and their fabrication in a printable color display panel.

PRIOR ART

2. The prior art sets forth a number of technologies capable of providing, through one or more means, a multi-color display panel, these technologies as follows:

1. Liquid crystal diode or display (LCD).
2. Plasma display panel (PDP).
3. Light-emitting polymers (LEP).
4. Other semi-conductive materials including field effect transistor systems.
5. Organic electro-luminescent (EL) displays.
6. Rigid crystal displays.

Patent representatives of Category 1 above are as follows:

| | | |
|---|---|---|
| 6,005,692 | Stahl | Light-Emitting Diode Constructions. |
| 6,456,423 | Nayfeh | Silicon Nanoparticle Microcrystal Nonlinear Optical Devices. |
| 6,573,960 | Kobayashi | Liquid Crystal Device Having Opening In Reflection Film Outside Pixel Area for Evaluating Color Filter and Light Shield, Its Method, and Apparatus. |
| 6,734,941 | Yamazaki | Liquid Crystal Display Device. |
| EPA 1,039,784 | Yokoyama | Light Source and Display Device. |
| | Philips Article. | "Digital Displays: Interfacing With The Future." |

LCD displays (Category 2) are well-known and are, inter alia, represented by such art as U.S. Patent Application Pub. 2004/0201551 to Suzuki, entitled Matrix Type Display Apparatus, Prior art representative of Category 3, that is, Light Emitting Polymers is as follows:

| | | |
|---|---|---|
| 2004/0201551 | Suzuki | Matrix Type Display Apparatus. |
| 6,268,092 | Akashi | Color Filer, Display Element, Display Method and Display Device. |
| 6,791,738 | Reynolds | Electrochromic Polymers And Polymer Electrochromic Devices. |
| 6,800,722 | Pei | Electroluminescent Polymers And Use Thereof in Light-Emitting Devices. |
| 6,858,325 | Senoo | Organic Compound and Electro-luminescent Devices Using The Same. |

Other semi-conductive materials (Category 4 above) are reflected in such art as U.S. Pat. No. 6,724,511 to Gudesen, entitled Matrix-Addressable Opto-Electronic Apparatus.

Category 5 above, namely, EL displays, is represented by the following art:

| | | |
|---|---|---|
| 4,871,236 | Gemma | Organic Thin Film Display Element. |
| 6,869,695 | Thompson | White Light Emitting Monomer And Aggregate Emission. |
| 6,872,113 | Yu | Method of Making Structure of Organic Light Emitting Material TFT Display. |

Category 6, that is, the use of rigid crystals in a display panel is reflected in U.S. Pat. No. 6,784,610 B2 (2004) to Ellis, entitled Display Panel Apparatus and Method. Ellis teaches the use of a matrix of carbon fibers to activate stacks of rigid crystals. Each carbon fiber acts as an emitter in a cell formed within three emulsion layers of a micro-crystal stack positioned vertically one atop another. Ellis, unlike Applicant's invention set forth herein, requires use of a multiplicity of carbon fibers within each emulsion layer of the nano-crystal stack. The structure and method of Ellis is, as well, not particularly adapted for use with printed micro-circuitry as is the case in present invention, as more fully described below.

The instant invention also differs from the art set forth above in that its display layer is that of a gel, i.e., a colloid having a dispersion phase which is dispersed throughout a dispersion medium, as opposed to the use of crystals, diodes, other semi-conductors, or polymers, as taught in the art. Certain of the prior art, e.g., the EL displays of Category 5 above could be employed either at said dispersion phase or as said dispersion medium within a gel as defined and set forth within the context of the invention which includes a new use of a high density carbon fiber as a charge of current input to an EL electronic gel in the manner set forth herein.

SUMMARY OF THE INVENTION

The inventive display structure includes a sub-pixel for use in a color pixel structure, the sub-pixel comprising microwire preferably printed on a substrate, said microwire having a gap therein and a high density carbon filament spanning said gap and having opposite ends of said filament in electrical communication with said wire; and an electro-optic or EL gel having a tint of one primary color of a white light spectrum, said gel enveloping said carbon filament. Each of said components of the sub-pixel is preferably encapsulated within an electrically inert material such a silicone.

Using such a sub-pixel, a color pixel structure, for use within an addressable color display matrix, may comprise a first planar EL or electro-optical sub-pixel including a first gel having a tint of a first primary color; means for furnishing an electron input to said first EO sub-pixel; a second planar EL or EO sub-pixel including a gel having a tint of a second primary color, said second sub-pixel substantially congruent in shape and area with said first sub-pixel and positioned in optimal proximity thereto; means for furnishing an electron input to said second sub-pixel; a third planar sub-pixel including a gel having a tint of a third primary color in substantially congruent overlay with said first and second sub-pixels and positioned in optimal proximity to both; means for furnishing an electron input to said third sub-pixel; and means for defining a ratio of relative electron input of said respective three electron furnishing means, to each respective sub-pixel to thereby produce a chromatic value of the composite optical output of all three sub-pixels specific to a particular ratio of primary colors effected by said ratio of electron inputs to each respective sub-pixels.

It is an object of the present invention to provide a sub-pixel of which may be formed a pixel, in which a gel of each respective sub-pixel is provided with a tint of a different color of a white light spectrum.

It is another object to provide a pixel of the above type with which an addressable color pixel circuit may be printed upon substrate, each pixel joined by appropriate printer microwire circuitry, to produce a high definition color display screen.

It is another object of the invention to provide a pixel of the above type printed as a part of an addressable pixel matrix upon either a hard or flexible surface.

It is a yet further object to provide a color pixel circuit using my inventive structure of pixels to produce low cost high definition color displays.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Historically, the element carbon has been viewed as an insulator having no, if any other electrical property. However, recent technical developments have made possible the creation of so-called carbon fibers or filaments which are formed out of long, thin sheets of carbon similar in nature to graphite. A common method of making carbon filaments is the oxidation and pyrolysis of polyacrylonitrile (PAN), a polymer used in the creation of many synthetic materials in the correct fashion (see http\\www.psrc.usm.edu/macrog/carfsyn.htm). Chains of PAN bonds are tied-to-side fashion to narrow bands of graphite which eventually merged to form a single jelly-like roll shaped format which is usually about 95% elemental carbon. These filaments are typically in a range of 20-50 microns in cross-section and can be long and continuous, short and fragmented, or may be directionally or randomly oriented. Short fibers, of the type employed as filaments in the within invention, have the lowest cost of fabrication. Each length of carbon fiber so fabricated is about 300 microns, but may be as great as 3,000 microns. A typical length/diameter ratio is 30, meaning that a carbon fiber having a diameter of 35 microns will have a length of about 1,000 microns. Other thinner fibers having a length-diameter of up to 800 may also be formed. Such fibers possess characteristics which differ from almost all other materials. That is, the linear expansion co-efficient of such of carbon fibers in the range of 30 million-psi modulus fibers to approximately $-1.3\times10(^{6})$ each/inch—F for ultra-high modulus fibers. This property makes possible the design of structures with zero or very low linear and planar expansion, a valuable characteristic for components in precision instruments and circuitry. High modulus carbon fibers exceed the thermal conductivity of copper. When density differences are considered, the specific thermal conductivity of carbon fibers can be as much as 8 times that of copper. This is of course counter-intuitive given carbon's history of use as an insulator. The instant invention is, in part, predicated upon the discovery that such carbon fibers, particularly high density carbon fibers possess conductive properties and as an electron emitter as, for example, is taught in the specification of U.S. Pat. No. 6,784,610 B2 (2004) to Ellis. This invention however relates to a different application of these properties of carbon fibers as an electron emitter, more fully set forth below.

Figure 1:
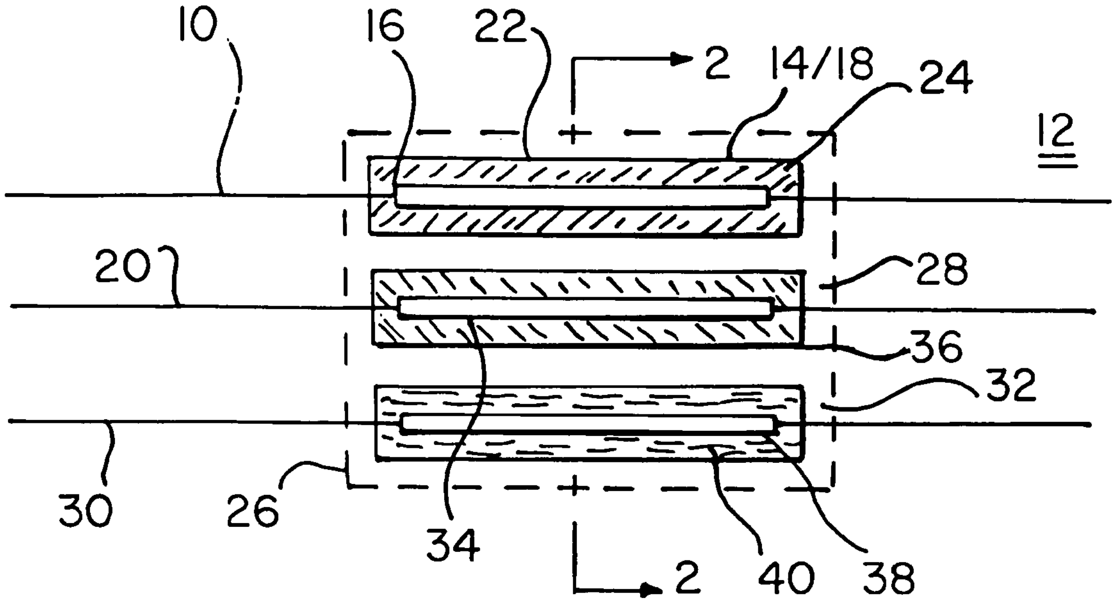
FIG. 1 is a top cross-sectional frontal, vertical view of a color pixel in accordance with the present invention, showing the sub-pixel thereof.
Figure 4:
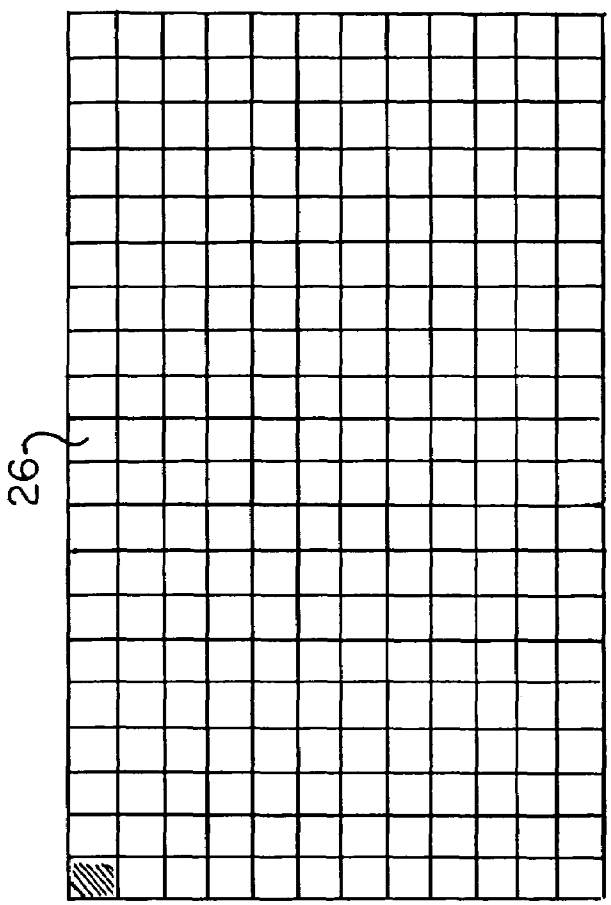
FIG. 4 is a conceptual view of a matrix comprising pixels of the type shown in FIG. 1.

With reference to FIG. 1, there is shown a schematic cross-sectional view of the display matrix, conceptually shown in FIG. 4, a combination of three sub-pixels. More particularly, in FIG. 1 are shown microwires 10, 20 and 30 which are preferably printed upon a substrate 12. The substrate may comprise a thermal polymer or a paper-like material. Each microwire includes a gap 14 between ends 16 of microwire 10/20/30 in which is disposed a preferably high density carbon filament 18 of the type set forth above. As noted, carbon fibers in the micrometer range have been found to have properties of electron emission or field creation notwithstanding the generalized bulk property of carbon as an insulator. Given a sufficient flow of current through micorwire 10/20/30/30, electrons will electrically communicate with carbon filament 16 in turn causing an electron emission or Coulomb field surrounding each filament. This emission or field is communicated to an electro-optic or EL gel 22 preferably printed upon filament 18 between said ends 16 of wire gap 14, upon said substrate 12. Electro-optic ("EO") gel 22 is provided with a tint of one primary colors of a white light spectrum, that is, one of the color red, blue or green. Carbon filament 18 is enveloped by said gel 22. The thickness or dimensionality of said gel relative to said filament 18 is a matter of design choice. The combination of filament 18 and EO gel 22, having a first tint, comprises a single sub-pixel of a larger pixel structure 26 which also includes sub-pixels 28 and 32. Shown beneath first sub-pixel 24 is said second sub-pixel 28, this consisting of second carbon filament 34, and a second EO gel 36. However, said gel possesses a tint of a second of said white light primary color. A third sub-pixel 32 comprises a third high density carbon filament 38 and third EO gel 40 which gel has a tint of a third primary color. As may be noted, said gels 22, 36 and 40 respectively are geometrically congruent with respect to said single pixel 26, so that a distinct chromatic value will occur as the level of current in the respective microwires 10, 20 and 30 is varied to define a specific ratio of electron input to the respective filaments to produce a specific ratio of electron emission thereof to the respective electro-optic gels 22, 36 and 40, a result thereof being the generation of a discreet chromatic value out of 500 potential different colors, this rendering possible the creation of a high fidelity, high resolution color display. Defining a desired ratio of current to the respective microwires of such a matrix is well established in the art as, for example, is reflected in said reference of U.S. Pat. No. 6,724,511 to Gudesen.

Figure 7:
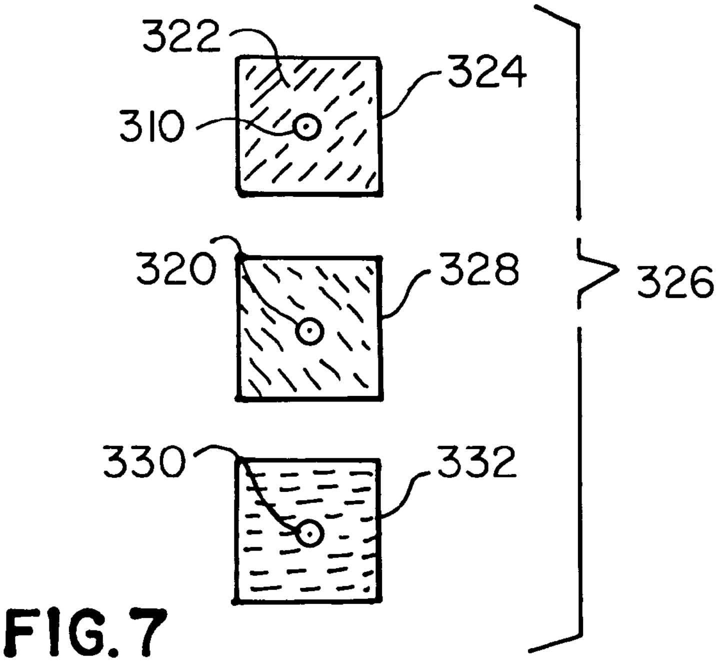
FIG. 7 is a view of a further embodiment of the invention.

It should also be appreciated that carbon fibers may, in another embodiment, be printed over microwires 10/20/30 as is shown in FIG. 7.

Figure 2:
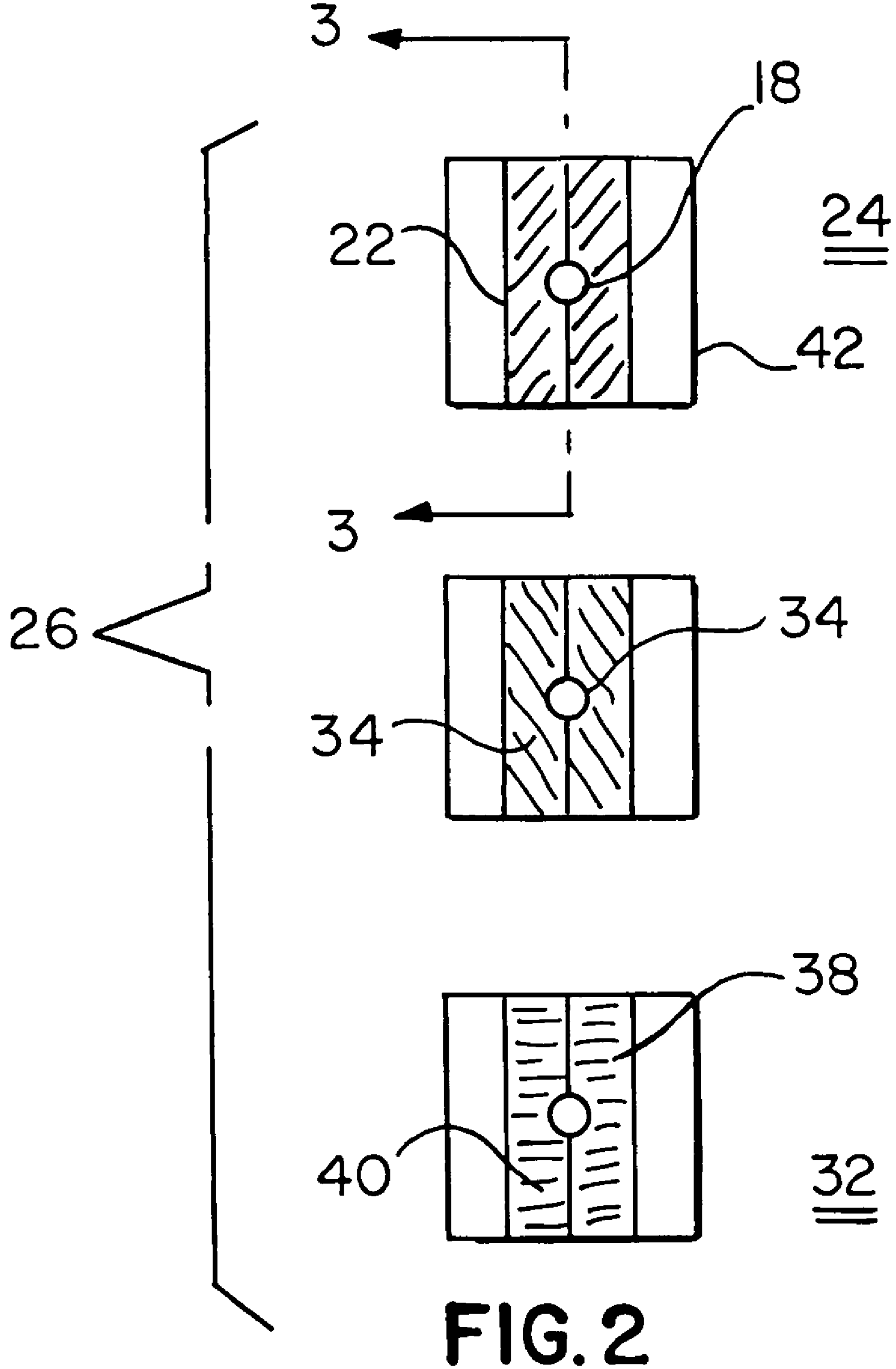
FIG. 2 is a cross-sectional view taken through Line 2-2 of FIG. 1.

Shown in FIG. 2 are respective high density carbon fibers 18, 34 and 38 within respective differently tinted gels 22, 36 and 40. Outside of the gel layer may be seen an outer silicone layer 42, and inert (in inert polymeric form of carbon) which may be used to seal each sub-pixel, as is more fully set forth below.

Figure 3:
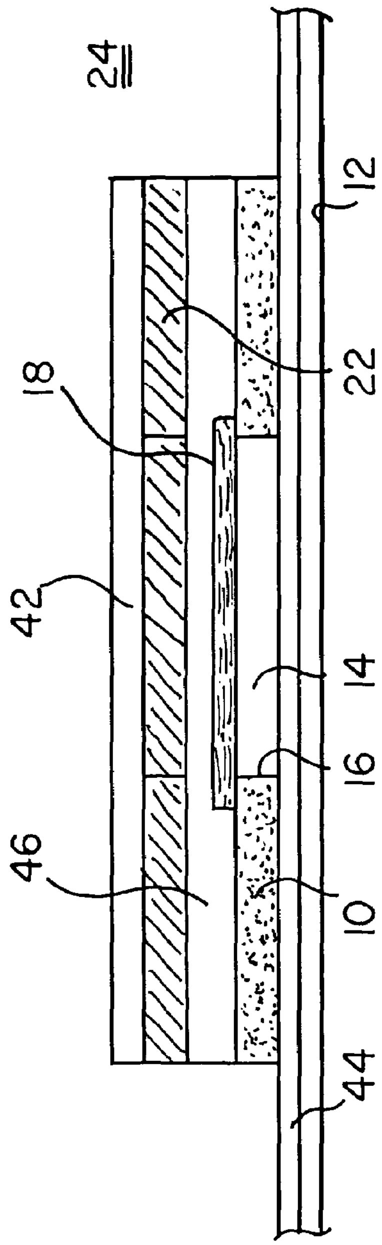
FIG. 3 is a cross-sectional view taken through Line 3-3 of FIG. 2

In FIG. 3 is shown a more detailed structure of each sub-pixel, for example, sub-pixel 24, includes said printed circuit substrate 12, a lower silicone layer 44, printed microwire 10, carbon filament 18, moderate silicone layer 46, a first tint gel 22, and said outer silicone layer 42.

Shown in FIG. 4 is an example of a matrix in which a multiplicity of said pixels 26, of the type shown in FIGS. 1 and 2 may be formed.

Figure 5:
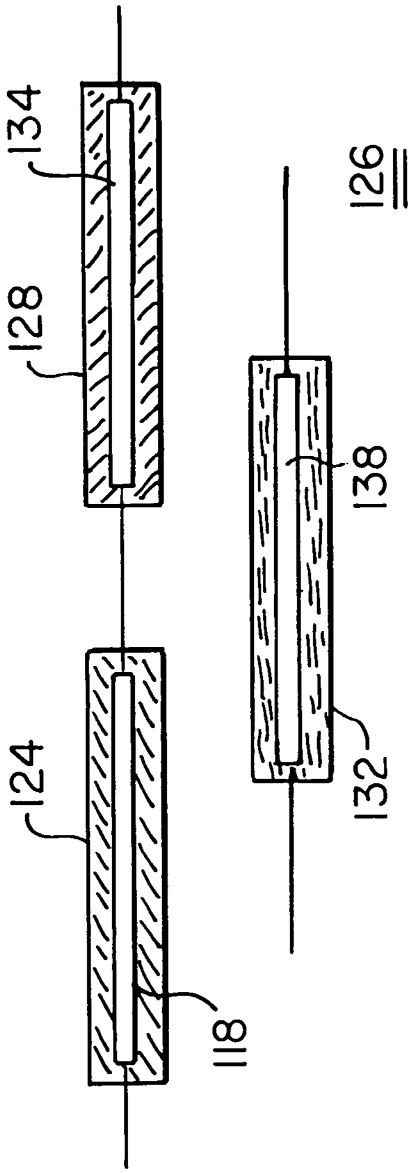
FIG. 5 is a cross-sectional view, similar to that of FIG. 1, however showing a different relative geometry of the sub-pixels thereof.
Figure 6:
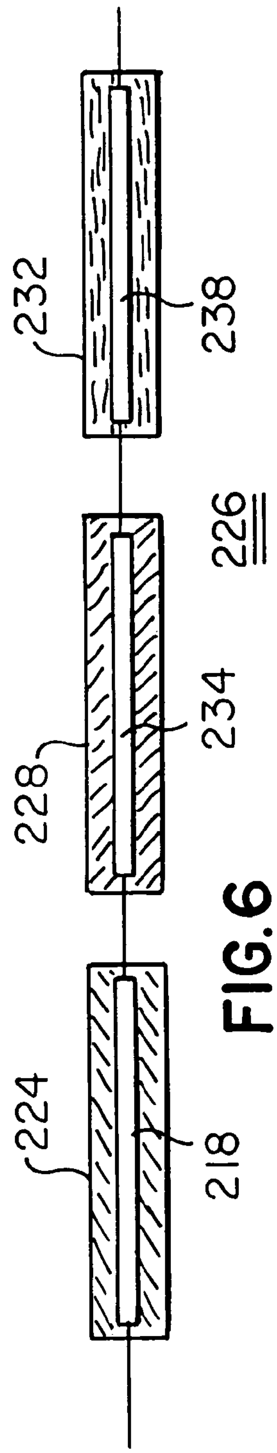
FIG. 6 is a view similar to that of FIG. 1, however showing a different relative geometry of the sub-pixels thereof.

Shown in FIG. 5 is a configuration, alternative to that of FIG. 1, of a different (a triangular) relative disposition of respective sub-pixels 124, 128 and 132. Similarly, shown in FIG. 6, is shown a linear relative disposition of the constituent sub-pixels 224, 228 and 232 of pixel 226. In other words, as long as each respective sub-pixel is within sufficient optical communication of the other, various dispositions of the sub-pixels, within a particular pixel, may be employed.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

The invention claimed is:

1. A color pixel structure, comprising: (a) a first planar electro-optical (EO) sub-pixel including a first gel having a tint of a first primary color; (b) means for furnishing an electron input to said first EO sub-pixel; (c) a second planar EO sub-pixel including a gel having a tint of a second primary color, said second sub-pixel substantially congruent with said first sub-pixel and positioned in optical proximity thereto; (d) means for furnishing an electron input to said second EO sub-pixel; (e) a third planar EO sub-pixel including a gel having a tint of a third primary color, said third sub-pixel in substantially congruent overlay with said first and second sub-pixels and positioned in optical proximity thereto; (f) means for furnishing an electron input to said third EO sub-pixel; (g) means for defining a ratio of relative electron output of said respective three electron input furnishing means, to each EO sub-pixel thereby producing a discrete chromatic value specific to a particular ratio of primary colors defined by said ratio of each electron input into each respective sub-pixel; (h) means for furnishing an electron input comprising a high density carbon fiber filament having a current or electron input and a photon output; and (i) a wire preferably printed on a substrate to which said high density carbon fiber filament is adhered, said wire providing said electron input thereto.

2. The system as recited in claim 1, in which said gel comprises: a colloid having a dispersed phase within a dispersion medium, said dispersed phase comprising a material having a photon output related to a level of electron input to said dispersion medium.

3. The structure as recited in claim 1, in which each of said sub-pixels includes: a capacitor spanning a gap between opposing ends of said electron input furnishing means.

4. A color pixel structure, comprising: (a) a planar first photonic sub-pixel including a first gel for providing a tint of a first primary color; (b) means for furnishing a photonic input to said first sub-pixel; (c) a planar second photonic sub-pixel including a gel for providing a tint of a second primary color, said second sub-pixel proportioned for substantial congruent overlay upon said first sub-pixel; (d) means for furnishing a photonic input to said second sub-pixel; (e) a planar photonic sub-pixel including a gel for providing a tint of a third primary color, said third sub-pixel proportioned for substantially congruent overlay over said first and second sub-pixels; (f) means for furnishing a photonic input to said third sub-pixel; (g) means for defining a ratio of relative photon outputs of each respective three photon input furnishing means, thereby providing a chromatic value specific to a particular ratio of primary colors defined by said ratio of photon output into each respective sub-pixel; (h) means for furnishing a photonic input comprising a high density carbon fiber filament having a current or electron input and a photon output; and (i) a wire preferably printed on a substrate to which said high density carbon fiber filament is adhered, said wire providing said electron input thereto.

5. The structure as recited in claim 4, further comprising: means for varying the level of photons provided to one or more of said sub-pixels to effect variations of hue of said discrete chromatic value of said pixel structure.

6. The structure as recited in claim 4, further comprising: means for concurrently increasing said level of photon input to all three of said sub-pixels, to effect an increase in luminosity of said chromatic value.

7. The structure as recited in claim 4, further comprising: a clear electronically inert enclosure encapsulating each respective sub-pixel.

8. The structure as recited in claim 7, further comprising: a clear electronically inert material encapsulating all three of said sub-pixels into a single pixel.

9. The structure as recited in claim 3, in which said clear electronically inert material comprises a silicone.

10. The system as recited in claim 4, in which said gel comprises a colloid having a dispersed phase within a dispersion medium, said dispersed phase comprising a material having a photon output related to a level of photon input to said dispersion medium.

11. The system as recited in claim 7, further comprising: means for furnishing said photon input to each gel.

12. The structure as recited in claim 4, in which each gel comprises a colloid.

* * * * *